Figure 1:
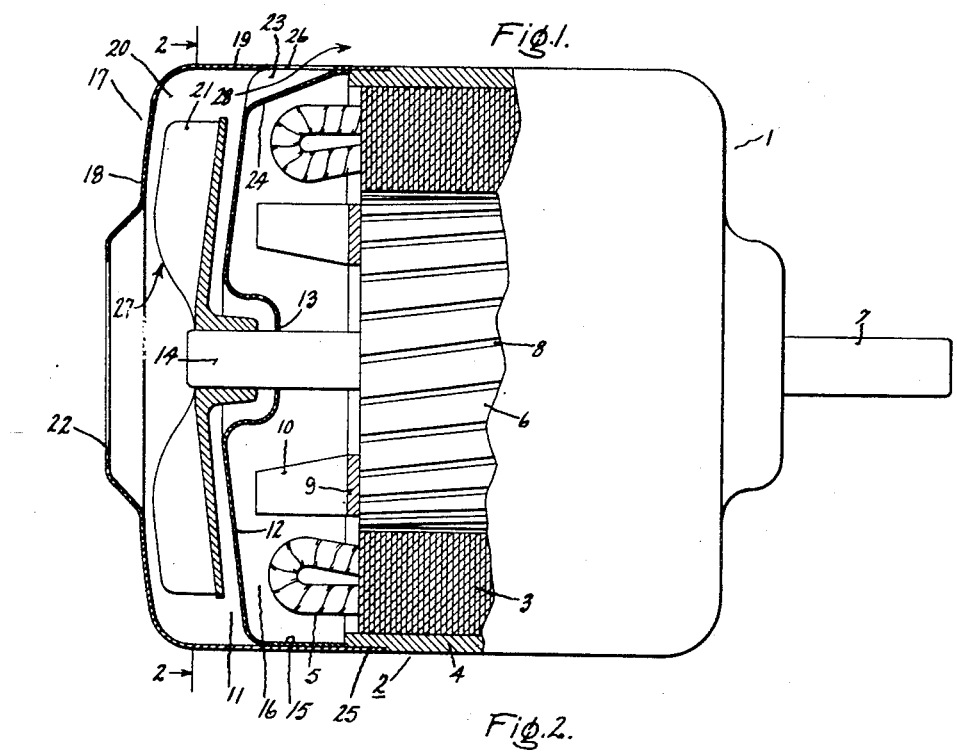

July 3, 1951  L. W. WIGHTMAN  2,559,382
DYNAMOELECTRIC MACHINE
Filed April 11, 1950

Inventor:
Lawrance W. Wightman,
by Ernest H. Britton
His Attorney.

Patented July 3, 1951

2,559,382

UNITED STATES PATENT OFFICE 2,559,382

DYNAMOELECTRIC MACHINE

Lawrance W. Wightman, Fort Wayne, Ind., assignor to General Electric Company, a corporation of New York Application April 11, 1950, Serial No. 155,214

7 Claims. (Cl. 171—252)

This invention relates to dynamoelectric machines and, more particularly, to dynamoelectric machines of the totally enclosed type.

In the design of totally enclosed dynamoelectric machines, it is desirable to provide a ventilating arrangement wherein external air is blown over the outer periphery of the enclosing casing in order to abstract the maximum amount of heat from the interior of the machine. It is also desirable that in such a machine none of the ventilating parts extend beyond the diameter of the main portion of the machine.

An object of this invention is to provide an improved ventilating arrangement for a dynamoelectric machine.

Another object of this invention is to provide an improved ventilating arrangement for a totally enclosed dynamoelectric machine.

A further object of this invention is to provide an improved ventilating arrangement for a totally enclosed dynamoelectric machine wherein cooling air is forced over the outer periphery of the machine without any of the ventilating parts extending beyond the outside diameter of the machine.

Further objects and advantages of this invention will become apparent and the invention will be better understood by reference to the following description and the attached drawing, and features of novelty which characterize this invention will be pointed out with particularity in the claims annexed to and forming a part of this specification.

In accordance with one aspect of this invention, there is provided a dynamoelectric machine having a stationary member and a rotatable member provided with a shaft. An inner enclosing end shield is provided having an outwardly extending portion apertured to receive the shaft and an axially extending flange portion at its outer periphery. An outer end shield is provided also having an outwardly extending portion and an axially extending flange portion at its outer periphery. The outwardly extending portion of the outer end shield is spaced from the outwardly extending portion of the inner end shield and a radial flow fan is secured to the shaft in the space defined between the two end shields. The axially extending flange portion of the inner end shield is arranged inside of and abutting the axially extending flange portion of the outer end shield which is, in turn, secured to the stationary member of the machine and is arranged flush with the outer periphery thereof. An opening is formed in the outwardly extending portion of the outer end shield for admitting air to the fan. A plurality of drawn-down portions are formed in the axially extending flange portion of the inner end shield, each of these drawn-down portions having a bottom portion sloping outwardly toward the other periphery of the stationary member of the machine and sides substantially perpendicular to the bottom portion. The axially extending flange portion of the outer end shield has a plurality of openings formed therein communicating respectively with the drawn-down portions of the inner end shield for discharging air from the fan. The outwardly sloping bottom portions of the drawn-down portions of the inner end shield serve to direct the air from the fan over the outer periphery of the stationary member of the machine and the sides of the drawn-down portions prevent the air from spinning out of the openings in the outer end shield flange portion and insure that the air is directed axially over the outer periphery of the machine.

Figure 2:
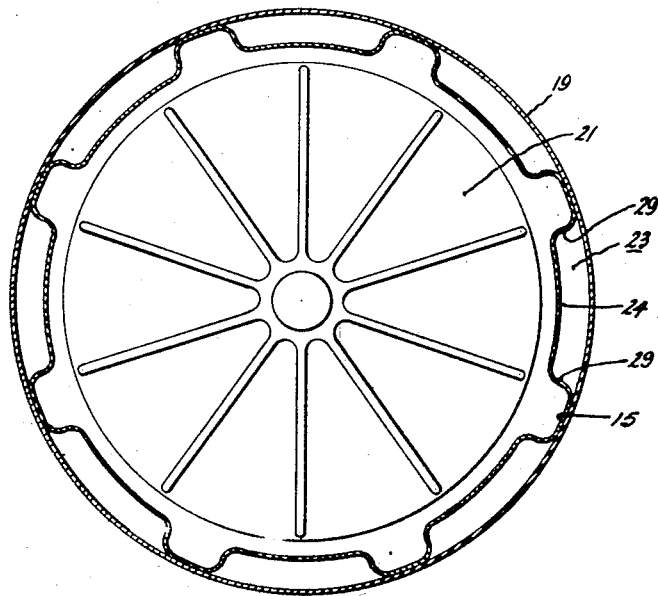

In the drawing, Fig. 1 is a side elevational view, partly in section, illustrating the improved ventilating arrangement of this invention; and Fig. 2 is a cross-sectional view taken along the line 2—2 of Fig. 1.

Referring now to Fig. 1, there is shown a dynamoelectric machine 1 of the unit bearing type; however, it will be readily understood that this invention is equally applicable to a dynamoelectric machine having two shaft bearings. The dynamoelectric machine 1 is provided with a stationary member generally identified as 2 comprising a stator core structure 3 formed of a plurality of laminations of relatively thin magnetic material, and an outer shell member 4. Appropriate windings 5 are positioned in slots (not shown) in the stator core member 3. A rotor 6, shown here as being of the squirrel cage type, is arranged within the stator core member 3 and is mounted on a shaft 7. The rotor 6 is shown provided with a squirrel cage winding 8 arranged in suitable slots in the outer periphery thereof and suitable end rings 9. A plurality of fan blades 10 may be cast integrally with the end ring 9 or, alternatively, a separate internal fan may be mounted on the shaft 7 to provide internal air circulation. In order to provide a totally enclosed construction, an inner enclosing end shield 11 is provided having an outwardly extending portion 12 provided with an aperture 13 to receive the extension 14 of the shaft 7. The inner end shield 11 is formed with an axially extending flange portion 15 at its outer periphery which abuts the end of the shell 4 of the stationary member 2. The inner enclosing end shield 11 thus defines a cavity 16 at the end of the machine enclosing the end turns 5 of the windings and the fan 10.

In order to provide for ventilation of the machine of Fig. 1, an outer enclosing end shield 17 is provided having an outwardly extending portion 18 and an axially extending flange portion 19 at its outer periphery. The outwardly extending portion 18 of the outer end shield 17 is spaced from the outwardly extending portion 12 of the inner end shield 11 defining a cavity 20. A radial flow fan 21 is arranged in the cavity 20 and is secured to the extension 14 of the shaft 7. An opening 22 is formed in the outwardly extending portion 18 of the outer end shield 17 for admitting air to the fan 21. In order to discharge air from the fan, the axially extending flange portion 15 of the inner end shield 11 has a plurality of drawn-down portions 23 formed therein. Each of the drawn-down portions 23 has a substantially flat bottom portion 24 sloping outwardly toward the outer periphery of the shell 4 of the stationary member 2. The axially extending flange portion 15 of the inner end shield 11 is arranged inside of and abutting the axially extending flange portion 19 of the outer end shield 17, which, in turn, is secured to the outer periphery of the shell 4 of the stationary member 2 by a rabbet fit as at 25. The axially extending flange portion 19 of the outer end shield 17 is arranged flush with the outer periphery of the shell 4 of the stationary member 2 to present an unbroken outer peripheral surface for the machine. A plurality of openings 26 are formed in the axially extending flange portion 19 of the outer end shield 17 communicating respectively with the drawn-down portions 23 of the inner end shield 11.

In operation, air is drawn into the cavity 20 by the fan 21 through the opening 22 in the outwardly extending portion 18 of the outer end shield 17, as shown by the arrow 27. The openings 26 in the axially extending portion 19 of the outer end shield 17 and the drawn-down portions 23 of the inner end shield 11 form jets which eject the air discharged by the fan 21 over the outer periphery of the motor at high velocity, as shown by the arrow 28. The drawn-down portions 23 are provided with sides 29 substantially vertical with respect to the bottom portions 24 in order to stop the air discharged by the fan 21 from spinning in the cavity 20 and to force it out of the openings 26 in an axial direction over the outer periphery of the shell 4. If the inner end shield 11 was not drawn down intermittently, as shown in Fig. 2, to provide a plurality of drawn-down portions, the air discharged by the fan 21 would spin out of the openings 26 and away from the motor without traveling over the outer periphery of the shell 4. Internal recirculation of air is provided by the fan blades 10. This internal recirculation abstracts heat from the windings 5 and the rotor 6 and permits heat transfer through the inner end shield 11.

It will now be readily apparent that this invention provides an improved ventilating arrangement for a totally enclosed dynamoelectric machine which is simple and economical to manufacture and in which no parts extend beyond the outside diameter of the motor shell. Since the air from the fan 21 is directed axially over the outer periphery of the shell after being in contact with the inner end shield 11, the maximum abstraction of heat from the motor is effected.

While I have shown and described a specific embodiment of this invention, further modifications and improvements will become apparent to those skilled in the art. I desire it to be understood, therefore, that this invention is not limited to the specific arrangement disclosed and I intend in the appended claims to cover all modifications which do not depart from the spirit and scope of this invention.

What I claim as new and desire to secure by Letters Patent of the United States is:

1. In a dynamoelectric machine having a stationary member and a rotatable member provided with a shaft, an inner enclosing casing at one end of said machine having an aperture to receive said shaft, an outer enclosing casing at said one end of said machine spaced from said inner casing, and a fan on said shaft arranged intermediate said inner and outer enclosing casings, said outer casing having an opening formed therein for admitting air to said fan, said inner casing having a depression formed therein, said outer casing having an opening formed in its circumferential surface, said depression having its end remote from said fan opening into said outer casing opening so that the air discharged by said fan is guided axially and radially by said depression and discharged through said outer casing opening axially over the outer surface of said machine.

2. In a dynamoelectric machine having a stationary member and a rotatable member provided with a shaft, an inner enclosing end shield at one end of said machine having an outwardly extending portion with an axially extending flange portion formed at its outer periphery, said outwardly extending portion having an aperture formed therein to receive said shaft, an outer enclosing casing at said one end of said machine having an outwardly extending portion and an axially extending outer peripheral portion, said outwardly extending portions of said outer enclosing casing and said inner end shield being spaced apart, said flange portion of said inner end shield being arranged within and abutting said axially extending portion of said outer enclosing casing, and a fan on said shaft arranged intermediate said outwardly extending portions of said outer enclosing casing and said inner enclosing end shield, said flange portion of said inner end shield having a drawn-down portion, said outwardly extending portion of said outer casing having an opening formed therein for admitting air to said fan, said axially extending portion of said outer casing having an opening formed in its circumferential surface, said drawn-down portion having its end remote from said fan opening into said outer casing opening so that the air discharged by said fan is guided axially and radially by said drawn-down portion and discharged through said outer casing opening axially over the outer surface of said machine.

3. In a dynamoelectric machine having a stationary member and a rotatable member provided with a shaft, an inner enclosing end shield at one end of said machine having an outwardly extending portion with an axially extending flange portion formed at its outer periphery, said outwardly extending portion having an aperture formed therein to receive said shaft, an outer enclosing casing at said one end of said machine having an outwardly extending portion and an axially extending outer peripheral portion, said outwardly extending portions of said outer casing and said inner end shield being spaced apart, said flange portion of said inner end shield being arranged within and abutting said axially extending portion of said outer casing, and a fan on said shaft arranged intermediate said outwardly extending portions of said outer casing and said inner end shield, said outwardly extending portion of said outer casing having an opening formed therein for admitting air to said fan, said flange portion of said inner end shield having a plurality of drawn-down portions formed therein, said axially extending portion of said outer casing having a plurality of openings formed in its circumferential surface, said drawn-down portions having their ends remote from said fan respectively opening into said outer casing openings so that the air discharged by said fan is guided axially and radially by said drawn-down portions and discharged through said outer casing openings axially over the outer surface of said machine.

4. In a dynamoelectric machine having a stationary member and a rotatable member provided with a shaft, an inner enclosing end shield at one end of said machine having an outwardly extending portion with an axially extending flange portion formed at its outer periphery, said outwardly extending portion having an aperture formed therein to receive said shaft, an outer enclosing end shield at said one end of said machine having an outwardly extending portion with an axially extending flange portion formed at its outer periphery, said outwardly extending portions of said outer and inner end shields being spaced apart, said flange portion of said inner end shield being arranged within and abutting said flange portion of said outer end shield, and a fan on said shaft arranged intermediate said outwardly extending portions of said inner and outer end shields, said outwardly extending portion of said outer end shield having an opening formed therein for admitting air to said fan, said flange portion of said inner end shield having a plurality of drawn-down portions formed therein, said flange portion of said outer end shield having a plurality of openings formed in its circumferential surface, said drawn-down portions having their ends remote from said fan opening respectively into said outer casing openings so that the air discharged by said fan is guided axially and radially by said drawn-down portions and discharged through said outer casing openings axially over the outer surface of said machine.

5. In a dynamoelectric machine having a stationary member and a rotatable member provided with a shaft, an inner enclosing end shield at one end of said machine having an outwardly extending portion with an axially extending flange portion formed at its outer periphery, said outwardly extending portion having an aperture formed therein to receive said shaft, an outer enclosing end shield at said one end of said machine having an outwardly extending portion with an axially extending flange portion formed at its outer periphery, said outwardly extending portions of said outer and inner end shields being spaced apart, said flange portion of said inner end shield being arranged within and abutting said flange portion of said outer end shield, and a fan on said shaft arranged intermediate said outwardly extending portions of said inner and outer end shields, said outwardly extending portion of said outer end shield having an opening formed therein for admitting air to said fan, said flange portion of said inner end shield having a plurality of drawn-down portions formed therein, said flange portion of said outer end shield having a plurality of openings formed in its circumferential surface, said drawn-down portions sloping outwardly toward the outer periphery of said stationary member and having their ends remote from said fan opening respectively into said outer casing openings so that the air discharged by said fan is guided axially and radially by said drawn-down portions and discharged through said outer casing openings axially over the outer surface of said machine.

6. In a dynamoelectric machine having a stationary member and a rotatable member provided with a shaft, an inner enclosing end shield at one end of said machine having an outwardly extending portion with an axially extending flange portion formed at its outer periphery, said outwardly extending portion having an aperture formed therein to receive said shaft, an outer enclosing end shield at said one end of said machine having an outwardly extending portion with an axially extending flange portion formed at its outer periphery, said outwardly extending portions of said outer and inner end shields being spaced apart, said flange portion of said inner end shield being arranged within and abutting said flange portion of said outer end shield, said flange portion of said outer end shield being secured to said stationary member and being arranged flush with the outer periphery thereof, and a radial flow fan on said shaft arranged intermediate said outwardly extending portions of said inner and outer end shields, said outwardly extending portion of said outer end shield having an opening formed therein for admitting air to said fan, said flange portion of said inner end shield having a plurality of drawn-down portions formed therein, said flange portion of said outer end shield having a plurality of openings formed in its circumferential surface, each of said drawn-down portions having a bottom portion sloping outwardly toward the outer periphery of said stationary member and sides substantially perpendicular to said bottom portion, said drawn-down portions having their ends remote from said fan opening respectively into said outer casing openings so that the air discharged by said fan is guided axially and radially by said drawn-down portions and discharged through said outer casing openings axially over the outer surface of said machine.

7. In a dynamoelectric machine having a stationary member and a rotatable member provided with a shaft, an inner enclosing end shield at one end of said machine having an outwardly extending portion and an axially extending flange portion formed at its outer periphery, said outwardly extending portion having an aperture formed therein to receive said shaft, an outer enclosing end shield at said one end of said machine having an outwardly extending portion with an axially extending flange portion formed at its outer periphery, said outwardly extending portion of said outer and inner end shields being spaced apart, said flange portion of said inner end shield being arranged within and abutting said flange portion of said outer end shield, and a radial flow fan on said shaft arranged intermediate said outwardly extending portions of said inner and outer end shields, said outwardly extending portion of said outer end shield having an opening formed therein for admitting air to said fan, said flange portion of said inner end shield having a plurality of drawn-down portions formed therein, said flange portion of said outer end shield having a plurality of openings formed in its circumferential surface, each of said drawn-down portions having a bottom portion sloping outwardly toward the outer periphery of said stationary member and sides substantially perpendicular to said bottom portion, said drawn-down portions having their ends remote from said fan opening respectively into said outer casing openings so that the air discharged by said fan is guided axially and radially by said drawn-down portions and discharged through said outer casing openings axially over the outer surface of said machine.

LAWRANCE W. WIGHTMAN.

REFERENCES CITED

The following references are of record in the file of this patent:

FOREIGN PATENTS

| Number | Country | Date |
|---|---|---|
| 276,433 | Great Britain | Aug. 29, 1927 |
| 546,760 | Great Britain | July 29, 1942 |
| 175,131 | Switzerland | Apr. 16, 1935 |
| 215,209 | Switzerland | Sept. 1, 1941 |